UNITED STATES PATENT OFFICE.

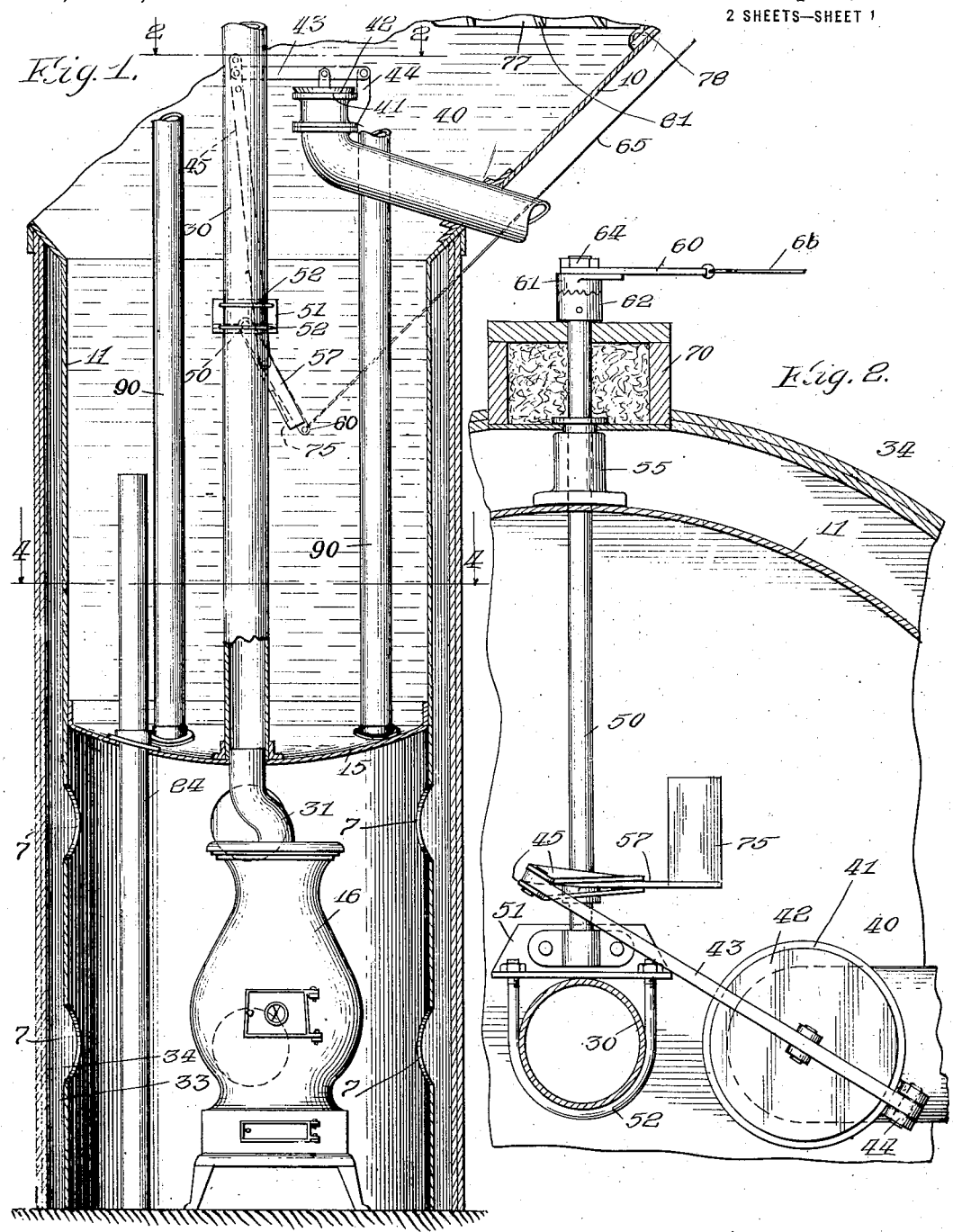

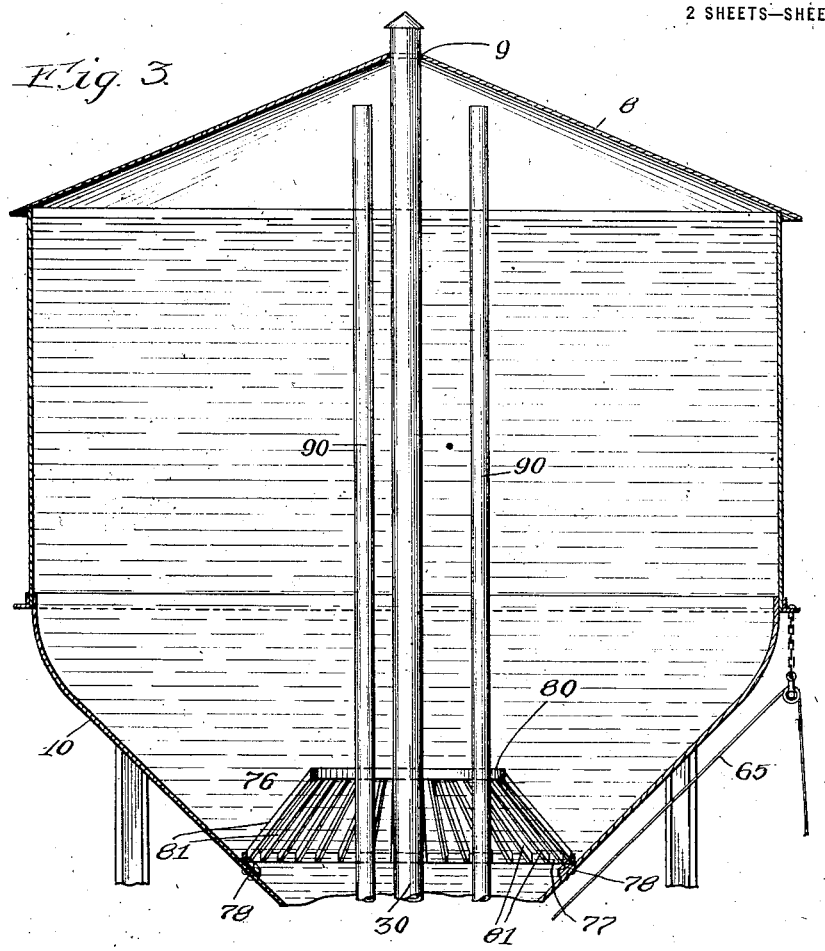
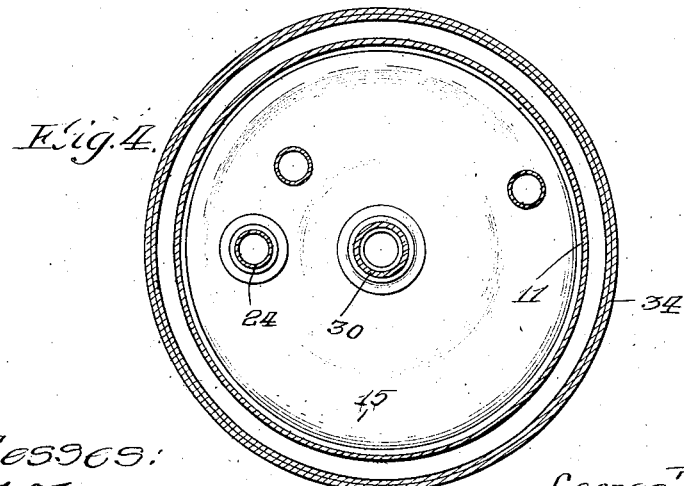

GEORGE T. HORTON, OF CHICAGO, ILLINOIS.

TANK.

1,177,704.  Specification of Letters Patent.  Patented Apr. 4, 1916.

Application filed August 14, 1914. Serial No. 856,759.

*To all whom it may concern:*

Be it known that I, GEORGE T. HORTON, a citizen of the United States, residing at 10226 Longwood avenue, in Chicago, county of Cook, and State of Illinois, have invented new and useful Improvements in Tanks, of which the following is a specification.

This invention relates to improvements in water tanks of the general type disclosed in my two prior patents, Number 857,626 issued June 25, 1907 and No. 1,008,645 issued November 14, 1911. Such a tank comprises in general the tank structure proper with an inclined bottom and supporting legs, and is additionally supported by a central water leg or cylinder which joins the bottom of the tank and forms a settling basin for mud and sediment. An inlet pipe is ordinarily arranged to supply water up through the settling basin or water leg, and an outlet valve is located above the water leg and in the lower part of the tank.
It has been found that when the tank is used in cold climates some protection is needed to prevent freezing of the water around the outlet valve and the operative parts connected therewith, which would interfere with their use. It has also been found that these parts are frequently injured by floating pieces of ice when the water level is lowered so far.

Accordingly the present invention relates more particularly to means for protecting the outlet valve and other parts of the tank against extremes of cold, and injury by floating pieces of ice, in such manner that the water supply may be available in all temperatures.

A device embodying the principles of the present invention is illustrated in the accompanying drawings in which:

Figure 1 is a view showing part of the tank in axial section, with an outlet valve and its operative parts disclosed therein. Fig. 2 is a view in horizontal section on the line 2—2 of Fig. 1. Fig. 3 is a view showing the upper part of the tank in axial section with an ice fender disclosed therein. Fig. 4 is a view in horizontal section on the line 4—4 of Fig. 1.

As shown in said drawings, that part of the inclined bottom of the tank (of the general construction described in my said prior patents) which joins the central water leg is indicated at 10, and the water leg or cylinder is indicated at 11. The cylinder 11 is divided by a false bottom 15 into an upper and a lower compartment; the former communicating with the tank above and being filled with water, and the latter affording a heating chamber in which is placed a stove or other suitable heating device 16, while access is afforded thereto through a door, not shown. A water supply pipe 24 extends up through the lower compartment of the cylinder 11, passes through the curved bottom 15, and extends to a sufficient height into the water chamber above to prevent the inflowing currents of water from disturbing the sediment in the cylinder; and to an opening in the center of the bottom 15 is joined a large pipe 30 which extends upward through the entire height of the tank and through an opening 9 in the roof 8 to form a chimney or flue for the stove 16, which is connected thereto by a length of stove pipe 31. In order to conserve the heat, the cylinder 11 is surrounded by a shell or frost casing 34 which may be made of steel, tile, brick, wood, or other suitable material, and is spaced away from the cylinder wall in order to afford an air space between the walls and the casing. Openings 7, 7, are provided in the cylinder 11 below the false bottom 15 to permit the circulation of air in order that warm air from the heating chamber may enter the space between the cylinder 11 and the shell or frost casing 34.

An outlet pipe and an outlet valve are shown at 40, such valve comprising a valve seat 41 adapted to be covered and uncovered by a movable valve disk 42 which is pivoted to a hinged valve arm 43; and one end of this arm is pivoted to a bracket 44 and the other end is connected to a double connecting rod 45 for lifting the valve disk from its seat. In order to protect these parts against freezing, the valve 40 with its operative parts as above described is arranged as closely as possible to the flue 30, and movement is imparted to the connecting rod 45 by other parts of the valve operating device which are likewise arranged closely adjacent to this flue and supported thereby. These parts are as follows: Below the valve 40 is arranged a horizontal shaft 50, one end of which is mounted in a journal member 51 which is secured to the pipe 30 by means of U-bolts 52 encircling it, and the other end of the shaft extends outward through the wall of the cylinder 11 and beyond the frost casing 34; such cylinder wall being provided with a stuffing box 55 around the shaft to prevent the escape of water. A crank arm 57 on the shaft 50 is connected to the lower end of the double connecting rod 45 for raising the valve from its seat by a rotation of the shaft; the valve being designed to close itself by the weight of the moving parts and the pressure of the water upon its upper surface. To the outer end of the shaft 50 is secured an actuating arm or lever 60 which is made with a hub 61 having notches engaging with a similarly notched collar 62 fixed to the end of the shaft; the hub 61 being retained on the end of the shaft by a nut 64 so that the hub and the fixed collar are locked together with their notches engaging each other but different settings of the valve lever may be obtained by loosening the nut and placing the lever at a different angle with respect to the fixed collar. The valve lever 60 may be actuated to open the valve by a pull upon a cable or rope 65 attached to its outer end and leading toward the place from which it may be desired to operate the valve. In order to permit access to the stuffing box 55 a large opening is made in the frost casing 34 and over this opening is built a housing 70 which is packed with hair, felt, or other heat retaining material.

As the parts are designed for the closing of the valve by the weight of the parts and as the out-flowing current of water may exert considerable pressure upon the valve disk and close it with too much force if means are not designed for retarding its movement, the crank arm 57 is made with a large vane 75 on its outer end and the resistance of the water against the movement of this vane will have a damping effect, permitting the valve to move slowly without requiring a considerable amount of force for its operation, but resisting its fast movement in closing.

Near the lower extremity of the inclined bottom 10 of the tank, and above the outlet valve is provided an ice fender 76. This ice fender is constructed of a relatively large, lower ring, 77, of iron, steel, or other suitable material fastened to the bottom 10 by depending lugs 78 which are riveted to such bottom, and a relatively smaller upper ring 80, with a series of bars 81, 81 joining said rings 77 and 80 and forming a grating.

Two heating pipes 90, 90, extend from the heating chamber below the false bottom 15 up through the water in the tank with their upper ends terminating above the highest level of the water and below the roof 8. The purpose of these heating pipes is to allow warm air to go through the water and to enter the space above the water and beneath the roof. Such circulation of warm air heats the water as it passes through and also warms the air in the space above the water and under the roof.

I claim as my invention:

1. In a water tank, a heating chamber with a flue extending through the tank, an outlet valve located in close proximity to such flue, and means for operating such outlet valve, such means including a part fixed to such flue.

2. A water tank having an inclined bottom, a water leg joined to such bottom, a heating chamber within such water leg, a covering around such water leg, a flue extending through such water leg, an outlet valve, and valve actuating parts arranged in close proximity to such flue.

3. A water tank having an inclined bottom, a water leg joined to such bottom, a heating chamber within such water leg, a covering around such water leg, a flue extending through such water leg, an outlet valve, and valve actuating parts arranged in close proximity to such flue, such parts including a shaft, mounted in a journal member secured to such flue, and extending outward through the wall of such water leg.

4. A water tank having an inclined bottom, a water leg joined to such bottom, a heating chamber within such water leg, a covering around such water leg, a flue extending through such water leg, an outlet valve, valve actuating parts arranged in close proximity to such flue, such parts including a shaft, mounted in a journal member secured to such flue, and extending outward through the wall of such water leg, and heat retaining means around the outer end of such shaft.

5. A water tank having an inclined bottom, a water leg joined to such bottom, a heating chamber within such water leg, a heating device within such heating chamber, a covering around such water leg, a flue extending from such heating device upward through such water leg and through such tank, an outlet valve, and valve actuating parts arranged in close proximity to such flue.

6. A water tank having an inclined bottom, a water leg joined to such bottom, a heating chamber within such water leg, a covering around such water leg, a flue extending through such water leg, a heating device connected to such flue, an outlet valve, valve actuating parts arranged in close proximity to such flue, and an additional flue extending from the heating chamber into the upper part of the tank.

7. A water tank with a water leg, a heating chamber within such water leg, an outlet valve and actuating parts arranged near the top of such water leg, and an ice fender above such outlet valve and actuating parts.

8. A water tank having an inclined bottom, a water leg joined to such bottom, a heating chamber within such water leg, an outlet valve and actuating parts arranged near the top of such water leg and submerged in the water, and an ice fender above such outlet valve and actuating parts.

In witness whereof, I have hereunto subscribed my name in the presence of two witnesses this 8th day of July, 1914.

GEORGE T. HORTON.

Witnesses:
 HENRY PENN,
 HARRY BOARDMAN.